E. E. WICKERSHAM.
SELF LAYING TRACK VEHICLE.
APPLICATION FILED MAY 26, 1917.
1,329,316.
Patented Jan. 27, 1920.
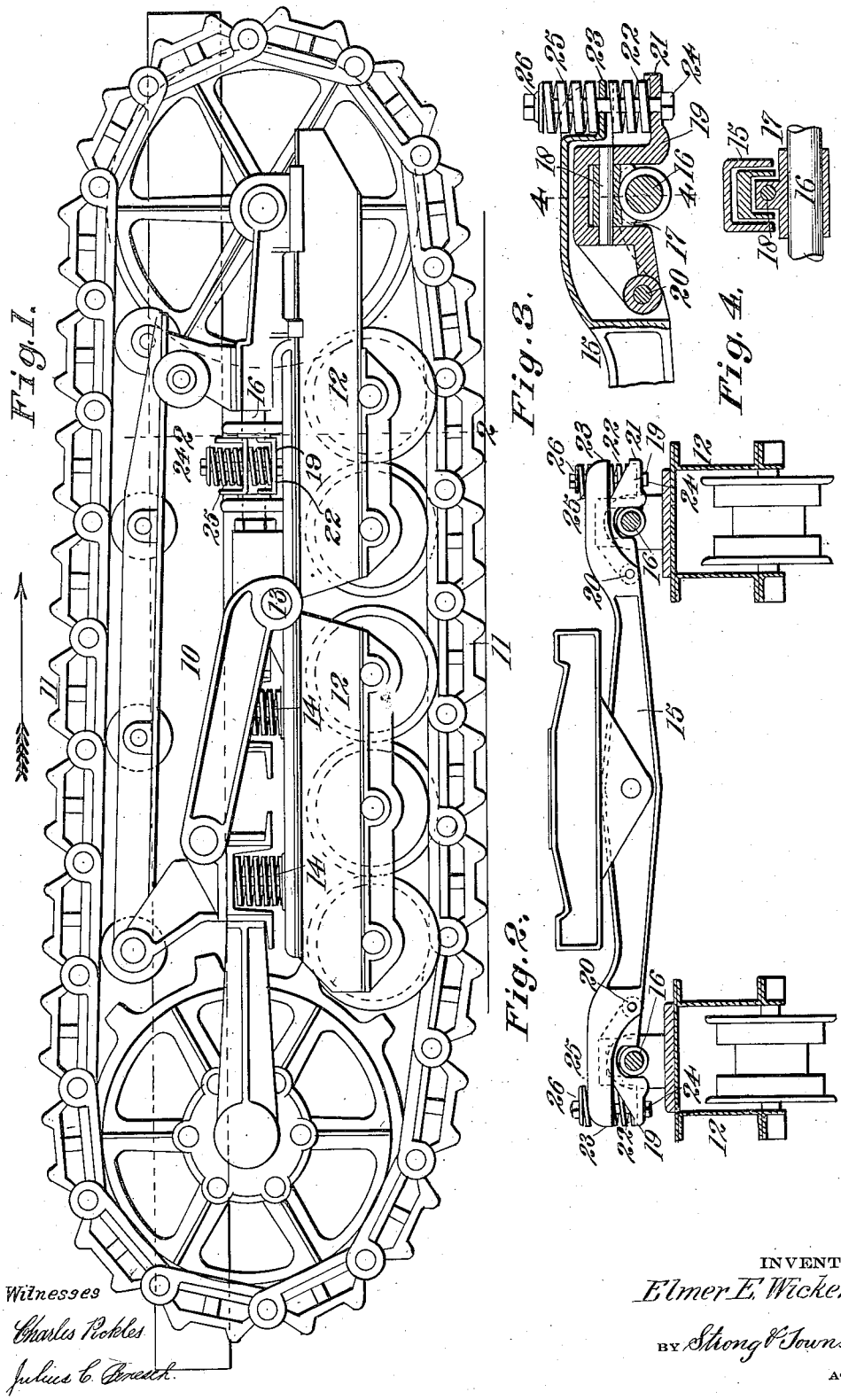
INVENTOR
Elmer E. Wickersham
BY Strong & Townsend
ATTORNEYS
Witnesses
Charles Pickles
Julius C. Bresch

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-LAYING-TRACK VEHICLE.

1,329,316.   Specification of Letters Patent.   Patented Jan. 27, 1920.

Application filed May 26, 1917. Serial No. 171,173.

*To all whom it may concern:*

Be it known that I, ELMER E. WICKERSHAM, a citizen of the United States, residing at Stockton, in the county of Alameda and State of California, have invented new and useful Improvements in Self-Laying-Track Vehicles, of which the following is a specification.

This invention relates to self-laying track vehicles, wherein the main frame is supported practically at three points upon roller truck mechanism, the rear portion being supported at opposite sides upon springs resting directly upon the roller truck frames. As hitherto constructed the connections between the equalizer bar and the roller truck frames were not resilient and offered no cushioning action. While these connections were flexible, all vibrations of the roller truck frames were imparted to the equalizer bar which in turn imparted them to the main frame of the vehicle.

The present invention has for its object to provide resilient supports between the equalizer bar and the roller truck frames, in connection with the universal joints, whereby the vibrations of the roller truck frames at the front will not be imparted to the main frame, and the said parts will be permitted a universal, flexible movement, the stability of the connections being in no wise impaired.

One form which my invention may assume is exemplified in the following description and illustrated in the accompanying drawings, in which—

Figure 1 shows a side elevation of a device embodying my invention.

Fig. 2 shows a sectional view, taken on the line 2—2 of Fig. 1.

Fig. 3 shows a detail, sectional view of one of the joints.

Fig. 4 shows a detail on the line 4—4 of Fig. 3.

The type of equalizer bar to which this invention is applied is shown in my copending case Serial Number 77,382, filed February 10, 1916.

The form of device herein shown comprises, generally, a main frame 10 carried upon endless, flexible tracks 11 through the medium of roller fitted trucks 12, at either side. The frames of the trucks are articulated, being provided with a transverse pivot 13 centrally thereof. The main frame is supported at the rear upon the truck frames by means of two sets of springs 14 and is carried at its front upon a transverse beam or equalizing bar 15, which is pivoted centrally to the main frame and is connected at its extremities to the forward sections of the roller truck frames by means of universal joints.

The universal joints comprise each a pivot pin 16, extending longitudinally of and fixed upon the truck frame, and a block 17 pivotally mounted thereon and receiving a transverse pin 18 which connects a yoke 19 thereto, said yoke being in turn connected by a pivot pin 20 to the equalizing bar at its inner end, said pin 20 extending transversely of the equalizer bar and permitting the bar and yoke to flex vertically. The outer end of the yoke 19 has a shelf 21 upon which rests a spring 22 receiving and supporting the projecting ends 23 of the equalizer bar. A pin 24 extends through the parts 21 and 23 and receives a spring 25 at its upper end which is depressed against the projecting end 23 of the equalizer bar by means of a cap 26 on the pin.

This joint, in addition to allowing flexible movements between the truck and equalizer bar about longitudinal and transverse pivots, permits relative movement vertically between the truck and bar on account of the pivotal connection 20 and the spring supports. Vibratory movements of the trucks are not, therefore, imparted to the main frame and the shocks received by the trucks in operation are taken up by the springs. The interposition of these springs into the universal jointed connections in no wise impairs the stability of the same and the trucks are restrained against fore and aft movements by said connections just as effectively as if the springs were not present.

Various changes in the construction and arrangement of the several parts herein shown and described may be made without departing from the spirit of my invention as disclosed in the appended claims.

Having thus described my invention, what I claim and desire to secure by Letters Patent is—

1. In a vehicle, the combination of a main frame, a flexible, endless track member at each side of the frame, a truck frame carrying rollers bearing upon the bottom run of each track, springs between the main frame and the rear end of each truck frame, a cross-bar centrally pivoted to the main frame and flexibly connected at its ends to the front ends of the truck frames at opposite sides, and resilient means included in said flexible connections whereby the vibratory movements of the truck frames are absorbed.

2. The combination with a vehicle frame of a pair of endless, flexible track members arranged on opposite sides thereof, and a truck mechanism for each track comprising anti-friction members to engage the bottom run of the track and a jointed frame therefor, the rear end of the vehicle frame being yieldingly supported on the rear sections of the truck frames and the forward end of the vehicle frame being resiliently and flexibly supported from a point between the truck mechanisms.

3. The combination with a vehicle frame, of a pair of endless, flexible tracks arranged on opposite sides thereof, a truck for each track composed of anti-friction devices bearing upon the ground run of the track, a jointed frame therefor, one portion of the vehicle frame being supported upon the rear sections of the truck frames, an equalizer bar connecting the front ends of the truck frames with the front of the main frame, and resilient connections between the equalizer bar and the truck frames.

4. In a self-laying track vehicle, a main frame, a pair of roller trucks, an equalizer bar between the front ends of opposite trucks to receive the main frame centrally thereon, universal joints connecting the ends of said bar with the frames of said trucks, and resilient means included in said connections permitting relative vertical movements between the trucks and equalizer bar.

5. In a self-laying track vehicle, a main frame, a pair of roller trucks, an equalizer bar between the front ends of opposite trucks to receive the main frame centrally thereon, a member supported on the frame of each truck for universal movement and having a pivotal connection with the adjacent end of the equalizer bar, and spring connections between said member and equalizer bar permitting relative movement vertically between the parts.

6. In a self-laying track vehicle, a main frame, a truck at each side thereof, an equalizer bar between the front ends of opposite trucks to support the front of the main frame, and connections between the equalizer bar and the trucks to permit the latter to move bodily vertically independently of the equalizer bar.

7. In a vehicle, the combination of a main frame, an endless, flexible track at each side of the frame, a truck frame carrying rollers bearing upon the ground run of each track, springs between the main frame and the rear end of each truck frame, a cross-bar centrally pivoted to the front of the main frame, and jointed connections between said cross-bar and each truck frame including resilient cushioning means whereby vibratory movements of the truck frames in a vertical direction are not imparted to the equalizer bar.

8. In a self-laying track vehicle, a main frame, a pair of roller trucks, an equalizer bar between the front ends of opposite trucks to receive the main frame centrally thereon, and flexible and resilient connections between each end of the equalizer bar and adjacent roller truck mechanism comprising a member supported directly on the frame of the roller truck for movement about longitudinal and tranverse horizontal pivots and pivoted at its inner end to the equalizer bar on a horizontal axis extending transversely of the equalizer bar, and spring means resting on the outer end of said member and supporting the overlying end of the equalizer bar.

9. In a self-laying track vehicle, a main frame, a pair of roller trucks, an equalizer bar between the front ends of opposite trucks to receive the main frame centrally thereon, flexible and resilient connections between each end of the equalizer bar and adjacent roller truck mechanism comprising a member supported directly on the frame of the roller truck for movement about longitudinal and transverse horizontal pivots and pivoted at its inner end to the equalizer bar on a horizontal axis extending transversely of the equalizer bar, spring means resting on the outer end of said member and supporting the overlying end of the equalizer bar, and a spring resting upon the outer end of said bar and pressing the same against the supporting spring by means of a pin connected with said pivotally supported member.

10. In a vehicle, the combination of a main frame, endless, flexible, self-laying tracks at opposite sides of the main frame, trucks within the tracks, and a three-point suspension for the frame on the trucks including a cross-member at one end of said trucks on which cross-member the frame is centrally pivoted to form a single point of support, and spring connections between the ends of the cross-member and trucks.

In testimony whereof I have hereunto set my hand in the presence of two subscribing witnesses.

ELMER E. WICKERSHAM.

Witnesses:
F. W. TARR,
E. O. BOQUIST,